United States Patent [19]

Davison et al.

[11] 4,339,804
[45] Jul. 13, 1982

[54] MEMORY SYSTEM WHEREIN INDIVIDUAL BITS MAY BE UPDATED

[75] Inventors: Alan B. Davison, San Diego; Wayne J. Lewis, Escondido, both of Calif.

[73] Assignee: NCR Corporation, Dayton, Ohio

[21] Appl. No.: 55,207

[22] Filed: Jul. 5, 1979

[51] Int. Cl.³ ............................ G11C 7/00; G06F 13/00
[52] U.S. Cl. ........................................ 364/900; 365/230
[58] Field of Search ... 364/200 MS File, 900 MS File; 365/189, 230

[56] References Cited

U.S. PATENT DOCUMENTS

| | | | |
|---|---|---|---|
| 3,350,690 | 10/1967 | Rice | 364/200 |
| 3,668,644 | 6/1972 | Looschen | 364/200 |
| 3,755,791 | 8/1973 | Arzubi | 364/200 |
| 3,868,646 | 2/1975 | Bergman | 364/200 |
| 3,889,237 | 6/1975 | Alferness et al. | 364/200 |

OTHER PUBLICATIONS

IBM Tech. Discl. Bull., Levine and Mandra, "Preserving Partial Data Fields and Deskewing of Data", vol. 14, No. 2, Jul. 1971, pp. 544–545.

Primary Examiner—Gareth D. Shaw
Assistant Examiner—Eddie P. Chan
Attorney, Agent, or Firm—J. T. Cavender; Edward Dugas; Stephen F. Jewett

[57] ABSTRACT

A memory system having a word-addressable memory and bit changing circuitry for changing or updating individual bits within the data words stored in the memory. The memory includes a primary memory and a copy memory. The copy memory stores duplicates of the data words stored in the primary memory. The bit changing circuitry receives a word having a bit to be changed from the copy memory and returns the word, including the changed bit, to both the primary memory and copy memory.

4 Claims, 6 Drawing Figures

MEMORY SYSTEM WHEREIN INDIVIDUAL BITS MAY BE UPDATED

BACKGROUND OF THE INVENTION

The present invention relates to data processing systems, and more particularly, the memories used in data processing systems.

During the operation of a data processing system, it is frequently necessary for data stored in the memory of the data processing system to be changed or updated. It is normally desired that any data changes be made as quickly as possible, since data updated during one step of a computer program may be needed during a subsequent program step.

In the past, it has not been difficult for data stored in a memory to be updated, since it was largely a matter of writing the new or updated data directly into the memory at the location of the old data. Where individual bits within a data word or group of bits stored at a memory location were to be changed, either a complete data word having the new data bits was generated or the memory was so constructed that each bit within the data word could be separately accessed and changed.

Permitting a memory to be written into at each individual bit location, however, tends to decrease the speed with which the memory can be accessed, since additional memory addresses are required for addressing individual bits. The resulting loss of speed in unacceptable in small, fast access memories, such as the scratch pad memory commonly used within the processor of a data processing system. If an individual bit is to be changed in such memories as presently designed, it is necessary that the entire data word containing the bit be read out of the memory, that the new bit be inserted into the word, and that the entire data word be written back into the original memory location. Using this approach, however, also decreases the speed of such memories since the memory is tied up during the reading and writing of the data word and is incapable of being accessed for other operations.

The use of duplicate memories, where each of two memories stores identical data, has been proposed in the past. For example, in U.S. Pat. No. 4,135,242, issued to William P. Ward et al. and assigned to the same assignee as the present application, there is shown in a processor a dual port scratch pad memory comprised of two memories containing duplicate data. During the operation of the processor, both memories can be accessed for operands. If an operation is to be carried out requiring two operands, both operands are fetched simultaneously.

Despite the use of duplicate memories in the past, there has not been provided a way to change individual bits in a word-addressable memory and, during the clock cycle that the bit is being changed, leave the memory in a condition so that it may be accessed during the same cycle for purposes of obtaining an operand or operands in carrying out some other processor operation.

SUMMARY OF THE INVENTION

In accordance with the present invention there is provided a memory system having a first or primary memory and a second or copy memory. The primary memory has a plurality of memory locations with each memory location for storing a data word or group of bits. The copy memory also has a plurality of memory locations for storing the same, or at least a portion of the same, data words or groups of bits that are stored in the primary memory. When one or more selected bits in a data word are to be changed, the copy memory is accessed for that data word and the word is presented to bit changing circuitry for changing the bit. The data word, including the changed bit, is returned and written into both the primary memory and the copy memory.

In one embodiment described herein, a scratch pad memory having both a data memory section and a parity memory section is provided in a processor. The parity memory section includes both a primary parity memory and a copy parity memory, each for storing identical groups of parity bits. The output of the copy parity memory is connected to bit changing circuitry for changing one or more bits within each group of parity bits. After a bit has been changed, the group of parity bits is returned to both the primary parity memory and the copy parity memory. The bit changing circuitry includes two multiplexers, with one multiplexer for receiving and selecting from groups of new parity bits from plural sources and the other multiplexer for receiving the group of bits having a bit to be changed and the output of the first-mentioned multiplexer and for selecting the bit position of the parity bit to be changed.

In another embodiment, the multiplexers in the bit changing circuitry are so arranged that one multiplexer receives a group of parity bits from the copy parity memory as well as bits from parity sources which provide the bits at a high speed in relation to the processor. A second multiplexer receives the output of the first multiplexer and also bits from a source providing the bits at a slower speed. The output of the second multiplexer is the group of parity bits having one or more of its bits changed, and those bits are returned and written into both the primary parity memory and the copy parity memory.

It is, therefore, an object of the present invention to provide an improved memory system.

It is another object of the present invention to provide a memory system that may have individual bits stored in the system changed or updated.

It is another object of the present invention to provide a memory whose contents may be accessed only one word at a time, but which may have individual bits within any word changed or updated.

It is a further object of the present invention to provide an improved scratch pad memory in a processor, with the memory having a parity section that may be accessed only for a group of parity bits at a time and that may have individual bits changed within each group of parity bits.

These and other objects of the present invention will become more apparent when taken in conjunction with the attached drawings and the following description.

DESCRIPTION OF THE PREFERRED EMBODIMENTS

Figure 1:
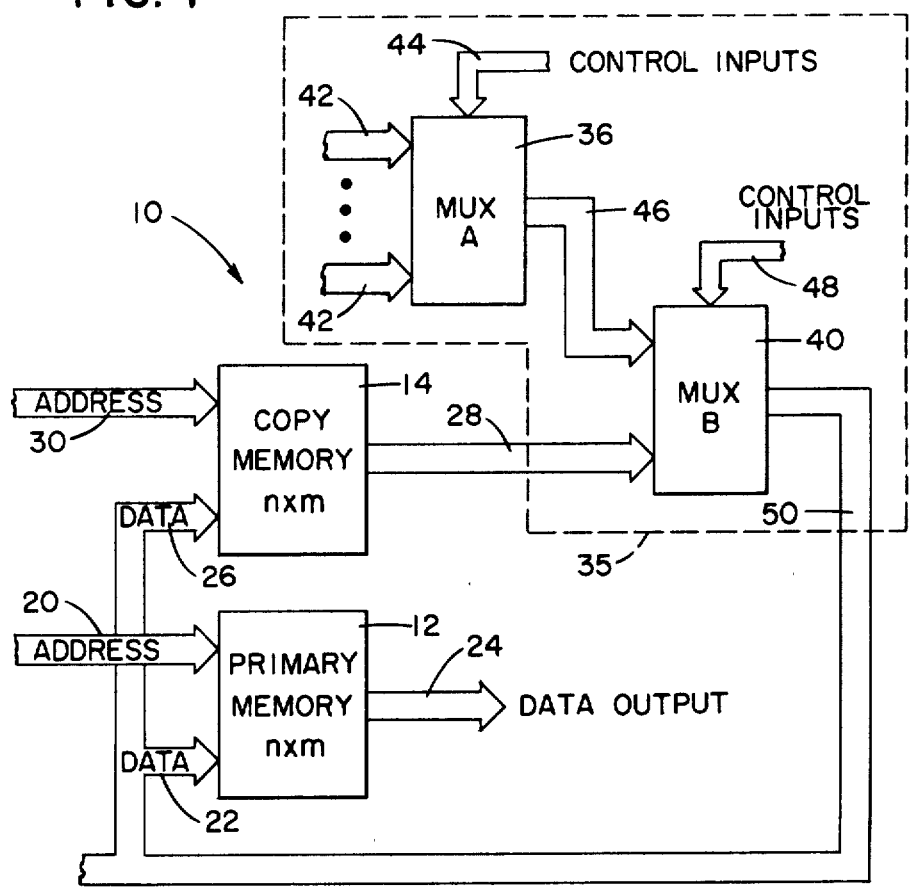
FIG. 1 is a block diagram illustrating a memory system in accordance with the present invention.

Turning now to FIG. 1, there is shown a memory device or system 10 in accordance with the present invention. The memory device 10 includes a primary memory 12 and a copy memory 14. The primary memory 12 accomplishes the main memory functions of the memory device 10, including the storage of data words for use, for example, by a processor or the like. The primary memory 12 is word addressable. That is, it includes a plurality of memory locations, each memory location for storing a data word comprised of a plurality or group of bits. The primary memory 12 includes a plurality of address lines 20, a plurality of data input lines 22 and a plurality of data output lines 24. When the address of a specific memory location is received on address lines 20, one complete data word on input lines 22 will be written into the memory location, or one complete data word will be read from the memory location and appear on the data output lines 24.

For purposes of the present description, the number of memory locations in the primary memory 12 and the number of bits in the data word stored at each memory location are unimportant. As illustrated in FIG. 1, the primary memory 12 has a generalized size of "n×m", indicating that there are a total of "m" number of data words stored in the primary memory 12 and that each data word is comprised of "n" number of bits.

The actual construction of the primary memory 12 is also unimportant for purposes of the present description. Accordingly, primary memory 12 can be a TTL RAM, a MOS RAM, a charge coupled device, a bubble memory, or any other type of similar memory which can be both written into and read from. However, as will become apparent, the advantages of the present invention are fully realized only if primary memory 12 is word addressable rather than bit addressable. Furthermore, the advantages of the present invention are fully realized in fast access memory devices such as those used in pipeline processors having separate read and write address lines, rather than in slow bulk memories, such as magnetic tapes and cards.

The copy memory 14 is identical to the primary memory 12 and, accordingly, is also illustrated as having a size of "n×m". The copy memory 14 will store duplicates of the data words stored in primary memory 12 and has a plurality of data input lines 26, a plurality of data output lines 28, and address lines 30 for receiving the address of a specific memory location at which a data word provided on data input lines 26 is to be stored or the address of a specific memory location from which a data word is to be read out onto data output lines 28.

Although copy memory 14 is shown in FIG. 1 as having the same size as primary memory 12, the copy memory 14 need only store duplicates of the data words in primary memory 12 that are to have individual bits changed as will be described hereinafter. Accordingly, the copy memory 14 may, in some circumstances, have fewer memory locations than primary memory 12.

The output lines 28 of copy memory 14 are connected to provide a data word to bit changing circuitry 35, shown enclosed by broken lines in FIG. 1. The circuitry 35 includes a multiplexer 36 (MUX A) and a multiplexer 40 (MUX B). MUX A has groups of input lines, each group designated 42 and each group coming from a separate source (not shown) of new or updated data bits. MUX A also has control inputs 44 for receiving control signals, and data output lines 46 connected to provide selected bits to the inputs of MUX B. MUX B receives the selected bits on the output lines 46 of MUX A, the data from the output lines 28 of copy memory 14, and control signals on control input lines 48, and has output lines 50 which are connected to return a changed or updated data word to the data input lines 22 and 26 of the primary memory 12 and copy memory 14, respectively.

Because primary memory 12 and copy memory 14 each store "n" bits at each of their memory locations and because they are word addressable, each set or group of the data lines 22, 26, 24, 28, 42, 46 and 50 is comprised of "n" number of parallel lines for carrying "n" number of bits.

Turning now to the operation of the memory device 10, the primary memory 12 acts much like any conventional memory in a data processing system. When a memory location address is provided on address lines 20, a data word can be read from the memory location onto data output lines 24 or written into the memory location from data input lines 22. However, each time a data word is written into primary memory 12, whether the word is a new data word or a modification of a data word already in primary memory 12, the same data word is also written into copy memory 14.

When a single bit within one of the data words in primary memory 12 and copy memory 14 is to be changed, an address is received over the address lines 30 of copy memory 14. The data word so addressed is provided on the output lines 28 of copy memory 14 and from there is provided to MUX B. During the same period, data bits from one of the previously mentioned sources is received on one of the groups of data input lines 42 of MUX A. MUX A selects one of the groups of input lines 42 in accordance with the control signals at its control inputs 44 and presents the bits on that selected group of lines to its output lines 46 and, as a result, to MUX B. MUX B receives control signals at its control inputs 48, such control signals indicating which of the n bits in the data word coming from copy memory 14 along output lines 28 are to be changed to the values coming from MUX A along output lines 46.

For example, if only one bit in the data word from copy memory 14 is to be changed, MUX B passes all of the data word from copy memory 14 except that one bit. The corresponding bit position in the set of bits provided on the output lines of MUX A is exchanged for that one bit in the data word from the copy memory and is passed with the other bits in the data word. The resulting modified data word, including the changed bit, is carried by the output lines 50 of the MUX B back to both primary memory 12 and copy memory 14 and is stored in each to replace the original data word.

It can be appreciated from the above description that the memory device 10 can have individual bits within its primary memory 12 changed or updated even though it is only word-addressable. Consequently, the memory device 10 requires fewer address lines and can have a faster access time than memories that are bit-addressable. It can further be appreciated that during the same period that copy memory 14 is being addressed and is providing the data word to be changed to MUX B, and while MUX B acts in conjunction with MUX A to change one or more bits of the data word, primary memory 12 may be separately accessed by, for example, a processor that might have a need for one of the data words stored in memory device 10. Thus, the memory device 10 does not have its availability for accessing affected by the changing of an individual bit of a data word any more than, say, the writing of an entire new data word into primary memory 12.

Figure 2:
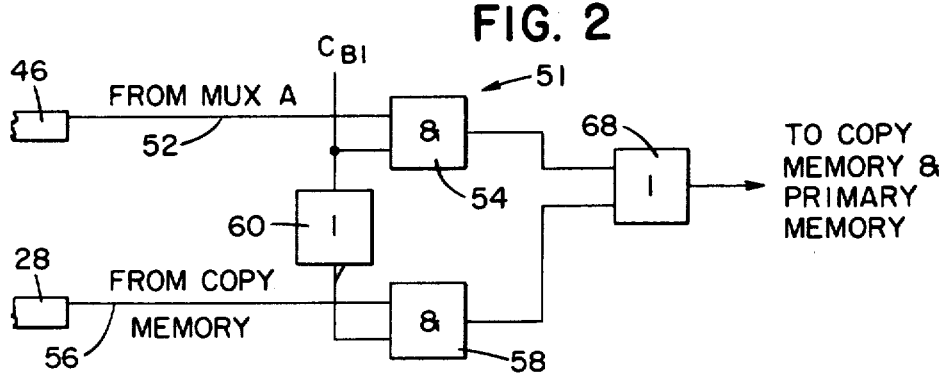
FIG. 2 is a block diagram illustrating a portion of the circuitry within MUX B of FIG. 1.
Figure 3:
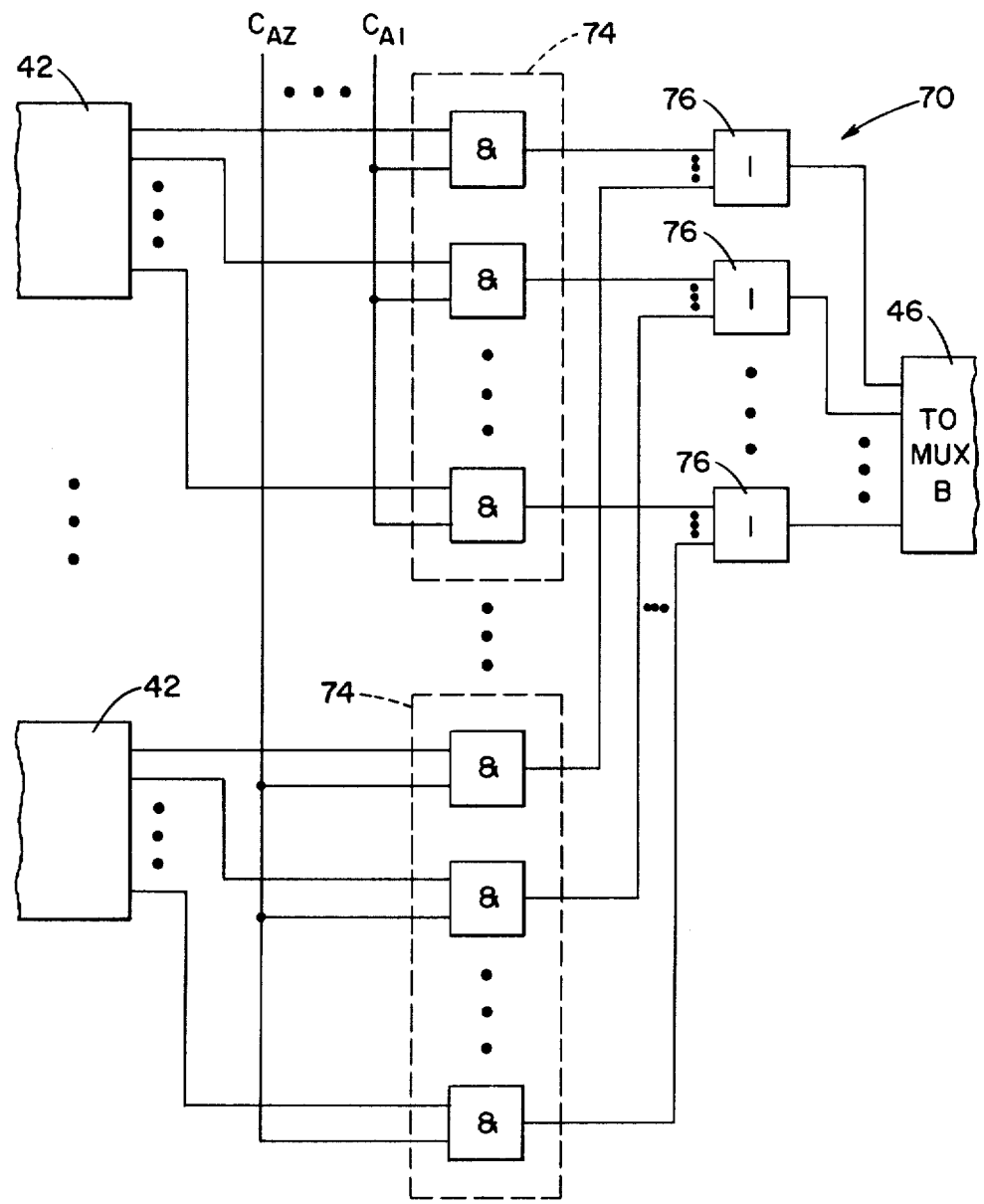
FIG. 3 is a block diagram illustrating the circuitry within MUX A of FIG. 1.

In FIG. 2 there is illustrated a portion of the circuitry in MUX B, and in FIG. 3 there is illustrated the circuitry of MUX A.

Turning first to FIG. 2, the illustrated portion of the circuitry of MUX B is designated 51 and it is responsible for passing one bit of the data word to the output lines 50 of MUX B. There would be an identical circuitry portion 51 associated with each of the other bits in the data word on the output lines 50 of MUX B. The circuitry portion 51 receives one bit from the output lines 46 of MUX A and one bit in the corresponding bit position from the output lines 28 of copy memory 14. The bit from MUX A is carried by an input line 52 to one input of an AND gate 54 and the corresponding bit from copy memory 14 is carried by an input line 56 to one input of an AND gate 58. One control line, identified as $C_{B1}$, of the control inputs 48 of MUX B is provided to the second input of AND gate 54 and, by way of an inverter 60, to the second input of AND gate 58. The outputs of AND gates 54 and 58 are provided to the two inputs of an OR gate 68, and the output of OR gate 68 in turn provides one bit in the changed or modified data word carried on the output lines 50 of MUX B back to each of the copy memory 14 and primary memory 12.

Referring still to FIG. 2, it should be apparent that when a bit in the data word received by MUX B from copy memory 14 is to be changed, the circuitry portion 51 associated with that bit position can accomplish the change by substituting the bit on input line 52 for the bit to be changed on line 56. For example, if the circuitry portion 51 shown in FIG. 2 receives bits from the first bit position in both the data word from copy memory 14 and the bits from MUX A, and if the bit in that first bit position of the data word is to be changed, a "1" logic level signal is provided at control line $C_{B1}$. The "1" at control line $C_{B1}$ will cause the bit from MUX A on input line 52 to be passed through AND gate 54 and OR gate 68 to one of the output lines 50. At the same time, the output of inverter 60 and the output of AND gate 58 are both at a "0" so that the bit from the copy memory on input line 56 is not passed.

If, on the other hand, there is to be no change to the bit in the first bit position of the data word from copy memory 14, a "0" logic level signal is provided at control line $C_{B1}$ and the output of AND gate 54 goes to a "0". The output of inverter 60 goes to a "1" and the bit coming from the copy memory on input line 56 is passed through AND gate 58 and OR gate 68 to one of the output lines 50.

Referring now to FIG. 3, there is illustrated the circuitry within MUX A. As described earlier, MUX A selects one of the groups of input lines 42 and passes the selected group to its output lines 46 and, in turn, to MUX B. As seen in FIG. 3, there is a group of AND gates 74 associated with each group of output lines 42, with each one of the AND gates 74 having an input for receiving one bit in the plurality of bits carried on its associated group of input lines 42. Each of the AND gates 74 has a second input for receiving a control signal from one of the control lines 44, individually designated in FIG. 3 as $C_{A1}$ through $C_{AZ}$. The output of each of the AND gates 74 is provided to an OR gate 76, along with the output from the corresponding gate in each of the other groups of AND gates 74 associated with each of the other groups of input lines 42. The outputs of the OR gates 76 are provided to the output lines 46 of MUX A.

In operation, the control lines $C_{A1}$ through $C_{AZ}$ control which of the groups of output lines 42 is to have its bits passed by MUX A. If, for example, the group of output lines 42 shown at the top of FIG. 3 is the group which is to be passed by MUX A to MUX B, the signal at control line $C_{A1}$ goes to a "1", and the other control lines, including the illustrated line $C_{AZ}$, go to a "0". As a result, the bits on the top group of output lines 42 pass through the AND gates 74 and through the OR gates 76 to the output lines 46. If some other group of input lines 42 is selected, the control line associated with that group goes to a "1" and the other control lines, including control line $C_{A1}$, are at a "0".

Figure 4:
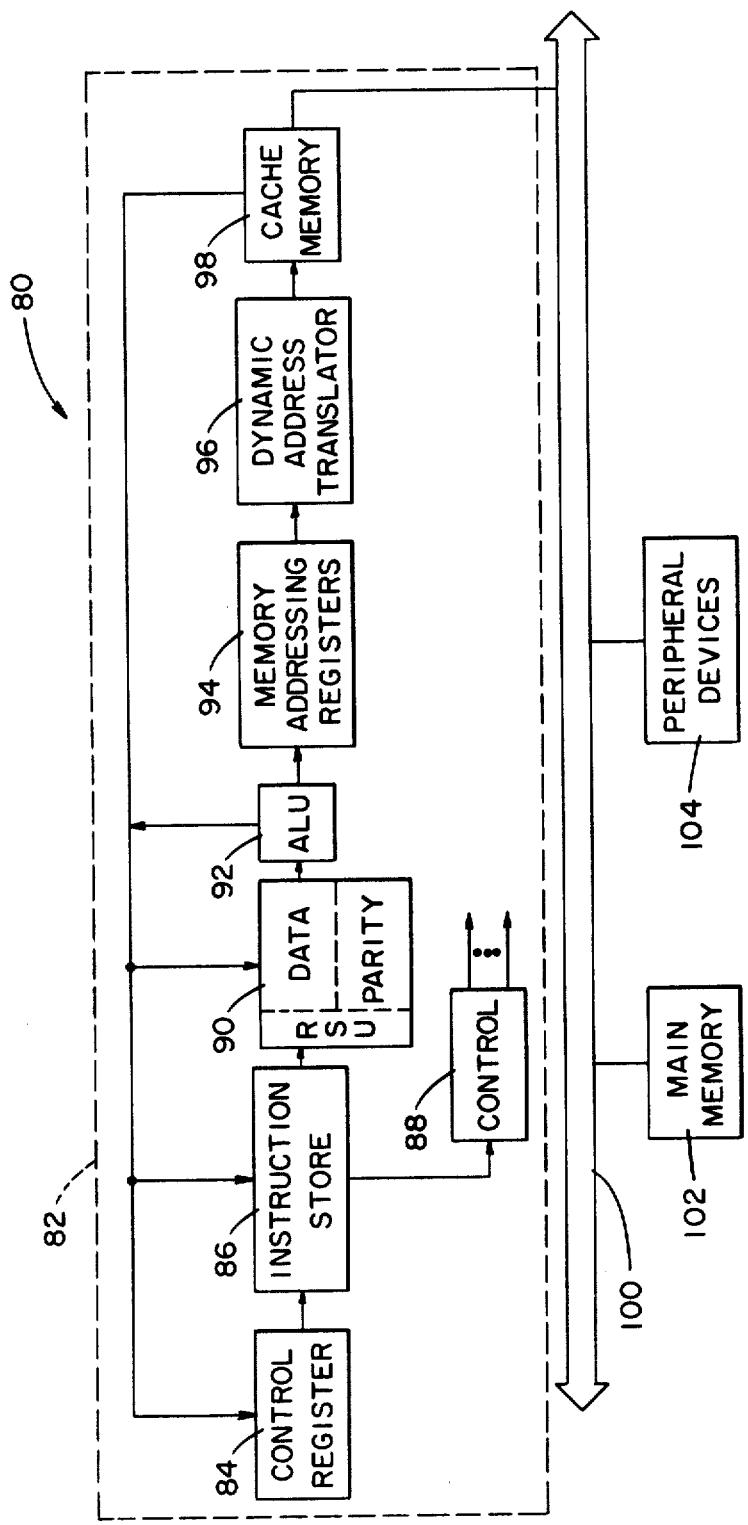
FIG. 4 is a simplified block diagram illustrating a processor having a register storage unit (RSU) and the location in the processor of a parity memory in accordance with the present invention.

FIG. 4 illustrates a data processing system 80, including a data processor 82 having a parity memory in accordance with the present invention. The processor 82 includes a control register 84, an instruction store 86, a control circuit 88, a register store unit (RSU) 90, and arithmetic-logic unit (ALU) 92, memory addressing registers 94, a dynamic address translater 96, and a cache memory 98. The processor is connected, by way of an internal transfer bus 100, to a main memory 102 and peripheral devices 104.

The processor 82 as thus far described and its operation are well known in the art. The control register stores the address of a selected firmware subroutine located in instruction store 86. Each firmware command in the selected subroutine includes an operation code (op code) delivered to the control circuit 88 and the addresses of data stored in the RSU 90. The control unit 88 provides the necessary control and timing signals in response to the op code from the instruction store 86 in order to assure the proper sequence of operations throughout the processor 82 during the execution of each firmware command. The data selected in the RSU 90 is provided to the ALU to be operated on, and any resulting memory addresses are received by the memory addressing registers 94. If the addresses in the memory addressing registers 94 are virtual addresses, they are converted by the dynamic address translator to real addresses specifying actual locations in the cache memory 98 or the main memory 102. The cache memory 98 is a high speed memory which stores some of the data contained in main memory 102, permitting fast access to the data when needed by the processor.

A processor similar to the processor 82 as described above is commercially available in one of the CRITERION 8500 series of computer systems sold by NCR Corporation, Dayton, Ohio.

Figure 5:
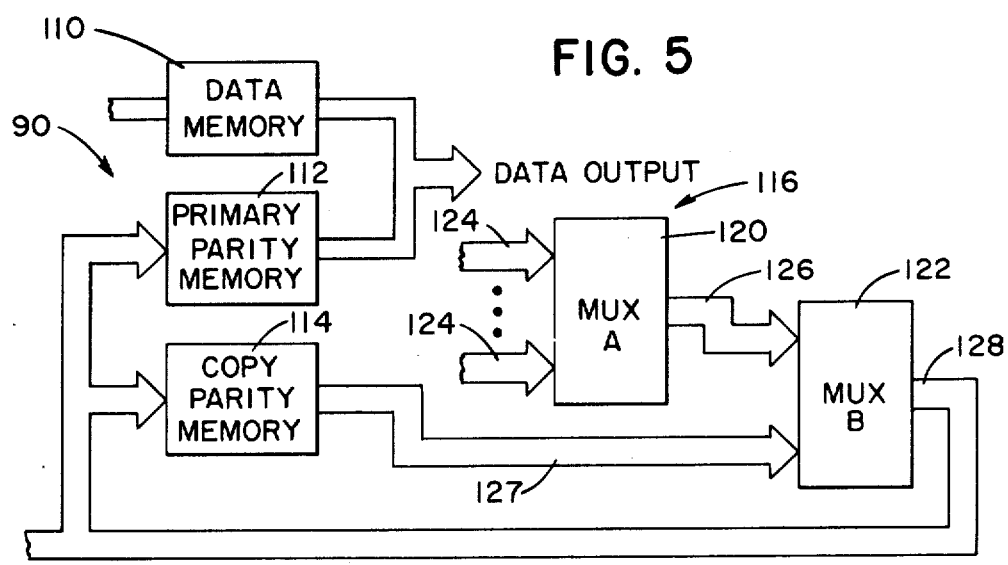
FIG. 5 is a block diagram illustrating in detail one embodiment of the RSU shown in FIG. 4.

The RSU 90 is illustrated in FIG. 4 as having both a memory for storing data and a memory for storing parity bits associated with the data. These two memories are shown in greater detail in FIG. 5, with the data memory designated 110 and the parity memory comprised of a primary parity memory 112 and a copy parity memory 114. Also shown in FIG. 5 is bit changing circuitry 116 for permitting individual bits within the parity memory to be changed in accordance with the present invention.

The data memory 110 and the primary parity memory 112 both provide bits at the data output of the RSU 90. The data memory 110 may, for example, provide 4 eight-bit bytes and the primary parity memory 112 may provide four parity bits, one parity bit associated with each byte in the data memory 110. Like the memory device 10 of FIG. 1, the copy parity memory 114 stores the same parity bits as the primary parity memory 112. When a parity bit in one of the words stored in the primary parity memory 112 is to be changed, the change is made by accessing the duplicate word in copy parity memory 114 and, after the four-bit word in copy parity memory 114 is accessed and the appropriate bit changed, the new four-bit word is returned to both the primary parity memory 112 and the copy parity memory 114.

Also, like the memory device 10 of FIG. 1, RSU 90 includes a multiplexer 120 (MUX A) and a multiplexer 122 (MUX B) in the bit changing circuitry 116. The RSU 90 changes or updates individual parity bits in the same fashion as memory device 10 changes data bits, wit MUX A selecting from a plurality of sources of new or updated parity bits coming from groups of data input lines 124. The sources may be external to the processor 82, such as the main memory 102 or the peripheral devices 104 in FIG. 4, or may come from the processor 82 itself as a result of a processor operation.

MUX B receives the selected new parity bits from output lines 126 of MUX A and the accessed parity word from output lines 127 of the copy parity memory 114, selects a bit in the parity word, and exchanges that bit with one of the new bits coming from the output lines 126 of MUX A. The new parity word is placed on output lines 128 of MUX B, and is returned to both the primary parity memory 112 and the copy parity memory 114.

The ability to change individual parity bits is particularly useful in a scratch pad memory, such as the RSU 90 in the processor 82 of FIG. 4, since there are often instances where only a single byte of data is changed and there needs to be a corresponding change to only the one parity bit associated with that byte. Rather than having the access time of the RSU 90 slowed by having parity bits individually addressable, the bit changing circuitry 116 in conjunction with copy parity memory 114 permits individual bits to be changed by reading a four-bit parity word from the copy parity memory and then making the appropriate change to one or more of the individual bits in the word. During the period that the copy parity memory 114 is being read and the individual bits are being changed, the primary parity memory 112 may be independently accessed by the processor for other operations.

Figure 6:
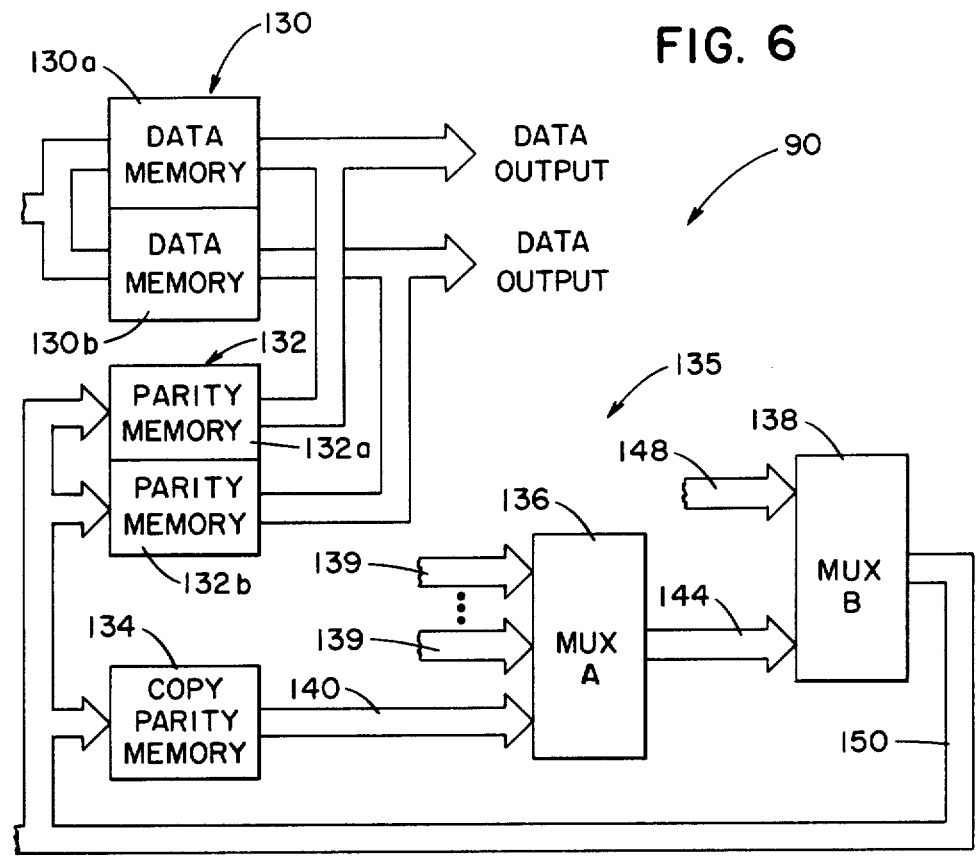
FIG. 6 is block diagram illustrating in detail an alternative embodiment of the RSU shown in FIG. 4.

In FIG. 6 there is illustrated the RSU 90 of FIG. 4, but slightly modified from that shown in FIG. 5. The RSU 90 has a data memory 130 comprised of two data memory sections 130a and 130b for storing duplicate data. Associated with the data memory 130 is a primary parity memory 132 comprised of two parity memory sections 132a and 132b for storing duplicate parity bits. The duplication of the data and parity bits in the memory sections of the data memory 130 and the primary parity memory 132 is not needed in order to change individual bits within the memories. Rather, this duplication is used in order to provide two operands simultaneously from the RSU 90 when needed by the processor, such as described in the aforementioned U.S. Pat. No. 4,135,242.

There is associated with the parity memory 132 a copy parity memory 134, which is identical to each of the parity memory sections 132a and 132b and which stores the same data as is stored in each of the parity memory sections 132a and 132b. The output of the copy parity memory 134 is provided to bit changing circuitry 135 comprised of a multiplexer 136 (MUX A), and a multiplexer 138 (MUX B). Unlike the previous embodiments shown in FIGS. 1 and 5, MUX A in FIG. 6 receives not only new or updated parity bits coming from a plurality of sources along groups of input lines 139, but also the parity word to be changed from output lines 140 of copy parity memory 134. Output lines 144 of MUX A are provided to MUX B, along with new parity bits from another source coming into MUX B along a group of input lines 148. The circuitry within MUX A and MUX B of FIG. 6 can be the same as the circuitry in the corresponding MUX A and MUX B of FIGS. 1 and 5.

As will be described in more detail below, the embodiment shown in FIG. 6 is used in a data processing system where new or updated parity bits which are to be exchanged for parity bits in the parity word from the copy parity memory may arrive at the RSU 90 with different speeds in relation to the processor. Accordingly, the sources which provide the new parity bits to the groups of input lines 139 of MUX A are relatively fast, while the source which provides the new parity bits over the input lines 148 of MUX B are slower.

When the bits of a parity word within the primary parity memory 132 are to be changed, the parity copy memory 134 is accessed and the selected parity word is presented on output lines 140 to MUX A along with the parity bits coming from any one of the fast sources along the groups of input lines 139. MUX A selects whether the parity bits from the copy parity memory 134 are to be passed through to MUX B, or whether an entire new parity word is to be selected from among one of the groups of data input lines 139. The bits on the output lines 144 of MUX A are presented to MUX B along with parity bits coming from the slower source of new parity bits along input lines 148. If an entire new parity word has been generated and selected from one of the sources at the input lines 139 at MUX A, MUX B then simply passes those new parity bits as an entire new parity word on to its output lines 150. On the other hand, if an individual parity bit in the parity word coming from copy parity memory 134 is to be changed, MUX A passes the parity word from the copy parity memory and MUX B exchanges one of the parity bits from the copy parity memory with one of the new bits presented on the input lines 148 to MUX B.

The embodiment shown in FIG. 6 has particular utility in a data processing system where the sources of new or updated parity bits include a parity generating circuit that is relatively fast, for example, a source of new data and parity bits external to the processor 82, and where other parity bits may come from a relatively slow source that may, for example, be located physically on the same circuit board as the RSU 90.

In the circuitry shown in both FIGS. 5 and 6, the data memory and parity memories shown could be implemented by plural 16×4 random access memories, such as circuit number 10145 memories sold by Fairchild Camera and Instrument Corporation, Mountain View, California. The multiplexers (MUX A and MUX B) could be implemented by circuit number 10155 and circuit number 10177 multiplexers, also available from Fairchild Camera and Instrument Corporation.

Although the presently preferred embodiments of the present invention have been described, it should be appreciated that within the purview of this invention various changes may be made within the scope of the appended claims.

What is claimed is:

1. A memory system, comprising:
   a first memory for storing data words having a plurality of bits and capable of being accessed only for one entire data word at a time;
   a second memory for storing at least some of the data words stored in said first memory;
   means for accessing a data word from said second memory and including means for changing the value of at least one bit of the accessed data word, said means for changing comprising:
   a first multiplexer for receiving groups of new bits from a plurality of sources and selecting one of the groups of new bits in response to a control input; and
   a second multiplexer for receiving the selected group of new bits from said first multiplexer and the data word having the bit to be changed from said second memory and exchanging one bit in the selected group of new bits from said first multiplexer with the bit to be changed in the data word from said second memory; and
   means for returning the accessed data word, including the at least one changed bit, to both said first memory and said second memory.

2. A memory system, comprising:
   a first memory providing the data output of said memory system and being word addressable, said first memory having a size of nxm, where m is the number of words stored in said first memory and n is the number of bits in each word;
   a second memory having a size of nxm and storing duplicates of the words stored in said first memory; and
   bit changing circuitry for changing individual bits of the words stored in said first and second memory, comprising a first multiplexer for receiving and selecting among several sources of groups of new bits, and a second multiplexer for receiving the selected group of new bits from said first multiplexer and a word having at least one bit to be changed from said second memory, said second multiplexer for exchanging the bit to be changed with one of the new bits and for providing the word having the changed bit for storage back in both said first memory and said second memory.

3. In a data processing system having a processor and a parity memory within said processor, the improvement wherein said parity memory comprises:
   a primary parity memory having data inputs and a plurality of memory locations, each memory location for storing a plurality of parity bits, said primary parity memory capable of being accessed only for the entire plurality of parity bits in each memory location at a time;
   a copy parity memory having data inputs and a plurality of memory locations corresponding to the memory locations in said primary memory and for storing the same pluralities of parity bits that are stored in said primary parity memory;
   bit changing circuitry for receiving the parity bits within one memory location of said copy parity memory, for receiving a new bit having a value to which one of the parity bits from said copy parity memory is to be changed, and for changing the one of the parity bits to the value of the new bit, said bit changing circuitry comprising:
   a first multiplexer connected for receiving and selecting among groups of new bits coming from a plurality of sources; and
   a second multiplexer connected for receiving a selected group of new bits from said first multiplexer and the parity bits, including the one of the parity bits to be changed, from said copy parity memory, and for exchanging the one of the parity bits from said copy parity memory with one of the new bits from said first multiplexer; and
   means for connecting said bit changing circuitry to the data inputs of both said copy parity memory and said primary parity memory so that the parity bits from the bit changing circuitry, including the changed bit, are returned to their corresponding memory locations in both said copy parity memory and said primary parity memory.

4. In a data processing system having a processor and a parity memory within said processor, the improvement wherein said parity memory comprises:
   a primary parity memory having data inputs and a plurality of memory locations, each memory location for storing a plurality of parity bits, said primary parity memory capable of being accessed only for the entire plurality of parity bits in each memory location at a time;
   a copy parity memory having data inputs and a plurality of memory locations corresponding to the memory locations in said primary memory and for storing the same pluralities of parity bits that are stored in said primary parity memory;
   bit changing circuitry for receiving the parity bits within one memory location of said copy parity memory, for receiving a new bit having a value to which one of the parity bits from said copy parity memory is to be changed, and for changing the one of the parity bits to the value of the new bit, said bit changing circuitry comprising:
   a first multiplexer for receiving the parity bits within one memory location of said copy parity memory and groups of new bits from one or more first sources that provide the new bits at a fast speed in relation to said processor, and for selecting either the parity bits or one of the groups of new bits; and
   a second multiplexer receiving the selected bits from said first multiplexer and groups of new bits from one or more second sources that provide the new bits at a slow speed in relation to said first sources, and for exchanging one of the bits from said second sources with one of the bits from said first multiplexer; and
   means for connecting said bit changing circuitry to the data inputs of both said copy parity memory and said primary parity memory so that the parity bits from the bit changing circuitry, including the changed bit, are returned to their corresponding memory locations in both said copy parity memory and said primary parity memory.

* * * * *